Figure 1:
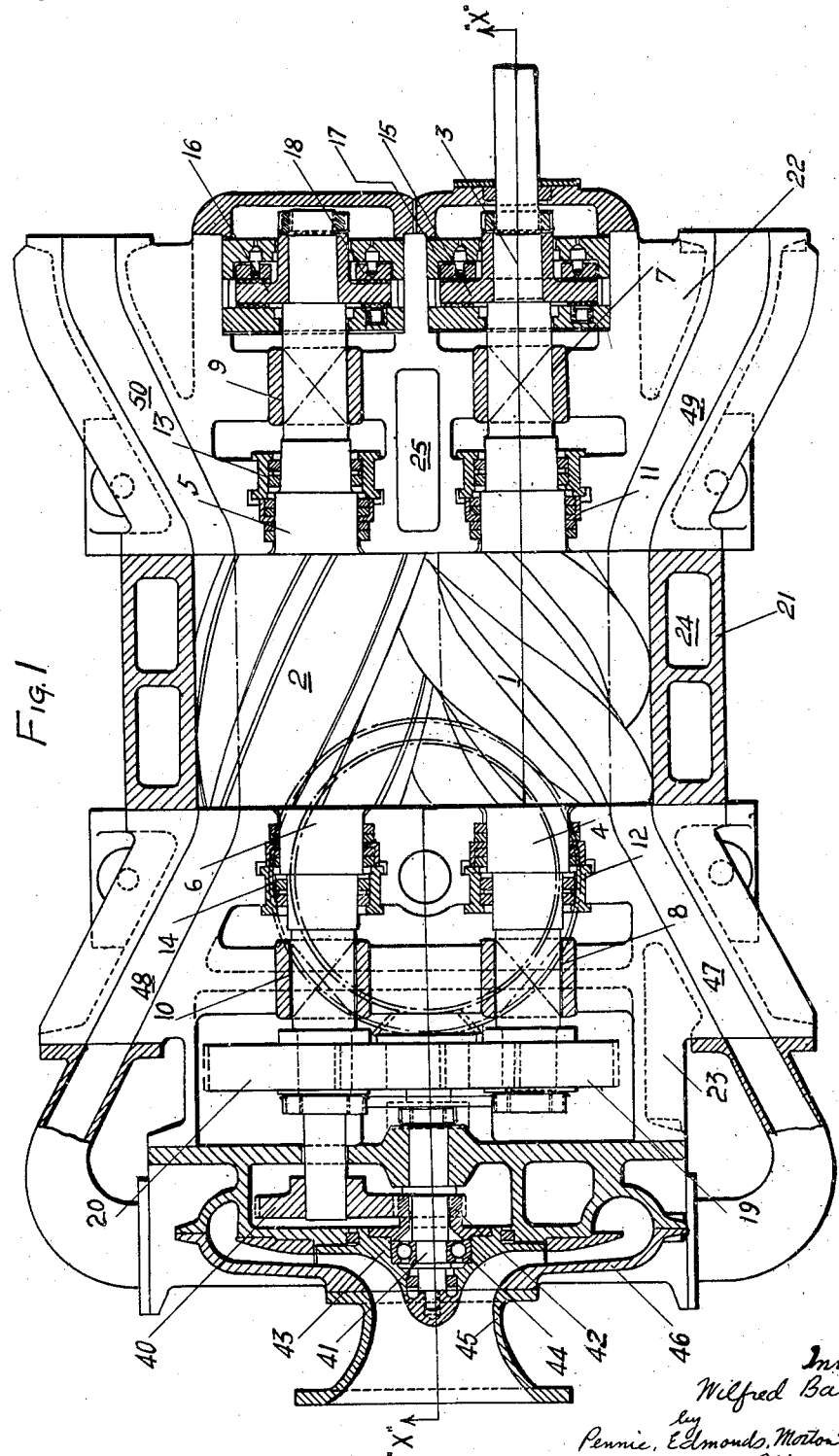

Oct. 25, 1949.  W. BAILEY  2,485,687
ROTARY ENGINE
Filed April 26, 1948  5 Sheets-Sheet 1

Oct. 25, 1949.   W. BAILEY   2,485,687
ROTARY ENGINE

Filed April 26, 1948   5 Sheets-Sheet 3

Inventor:
Wilfred Bailey
by
Pennie, Edmonds, Morton and Barrows
Attorneys

Oct. 25, 1949.     W. BAILEY     2,485,687
ROTARY ENGINE

Filed April 26, 1948     5 Sheets-Sheet 4

Inventor:
Wilfred Bailey
by
Pennie, Edmonds, Morton and Barrows
Attorneys

Oct. 25, 1949.   W. BAILEY   2,485,687
ROTARY ENGINE

Filed April 26, 1948   5 Sheets-Sheet 5

Inventor:
Wilfred Bailey
by
Pennie, Edmonds, Morton and Barrows
Attorneys

Patented Oct. 25, 1949

2,485,687

UNITED STATES PATENT OFFICE 2,485,687

ROTARY ENGINE

Wilfred Bailey, Glasgow, Scotland

Application April 26, 1948, Serial No. 26,809
In Great Britain April 25, 1947

4 Claims. (Cl. 123—12)

(Granted under the provisions of sec. 14, act of
March 2, 1927; 357 O. G. 5)

This invention relates to rotary engines of the type having rotors formed with intermeshing helical teeth and disposed within a casing.

According to the invention, in a rotary engine of the type referred to, for each pair of intermeshing rotors one end of a transfer conduit is communicable along with fuel introducing means with the interior of the casing opposite a predetermined angular position of a groove of one of the rotors where the inlet end of a tooth of one rotor first commences to leave the corresponding part of the co-operating groove in the adjacent rotor. The other end of the transfer conduit is communicable with the interior of the casing opposite the point where the exhaust end of said tooth almost completes the action of engagement with said co-operating groove. A source of supply of scavenging air is communicable with the casing, and the admission of scavenging air is arranged to take place at points where each groove to be scavenged of its combusted gases is open along its entire length to an exhaust port, said exhaust port communicating with the interior of the casing at a predetermined angular position of the groove containing combusted gases and at a time when the tooth is disengaged from said groove along its entire length i. e., where said tooth finally leaves said co-operating groove, valve means are provided to effect the necessary timing of the air and fuel admission and exhaust.

The teeth of each rotor may be single helical teeth or double helical teeth. With single helical teeth rotors the transfer conduit is connected to the appropriate parts of opposite ends of the casing. With double helical teeth rotors the transfer conduit is bifurcated towards one end, the ends of the bifurcation being each connected to an end of the casing and the other end of the transfer conduit being connected to the casing at a point opposite to that at which the junctions of the teeth of right hand pitch and the teeth of left hand pitch of the rotors mesh with one another. With double helical teeth end thrust is substantially balanced.

The casing may contain two or more intermeshing rotors.

Co-operation of the edges of the teeth of the rotors with ports in the casing may constitute the valve means where convenient, or separate valves operated by valve gear may be provided.

The fuel may be injected in liquid form into the casing, or may be injected into the transfer conduit.

The rotors may be kept in step by meshing external gear wheels.

Leakage past the tips of the teeth on the rotors may be reduced by inserted strips of anti-friction material. Water may be fed to the interior of the rotors and may be ejected in a spray against the inner wall of the casing, whereby to assist in cooling the casing.

The rotors may be cooled by cooling fluid circulating in passages formed in the rotors.

The engine may be arranged to operate on a constant volume cycle or on a constant pressure cycle.

Scavenging air may be supplied from a compressor driven by the exhaust gases from the engine.

Cooling means may be provided in the transfer conduit.

Figure 2:
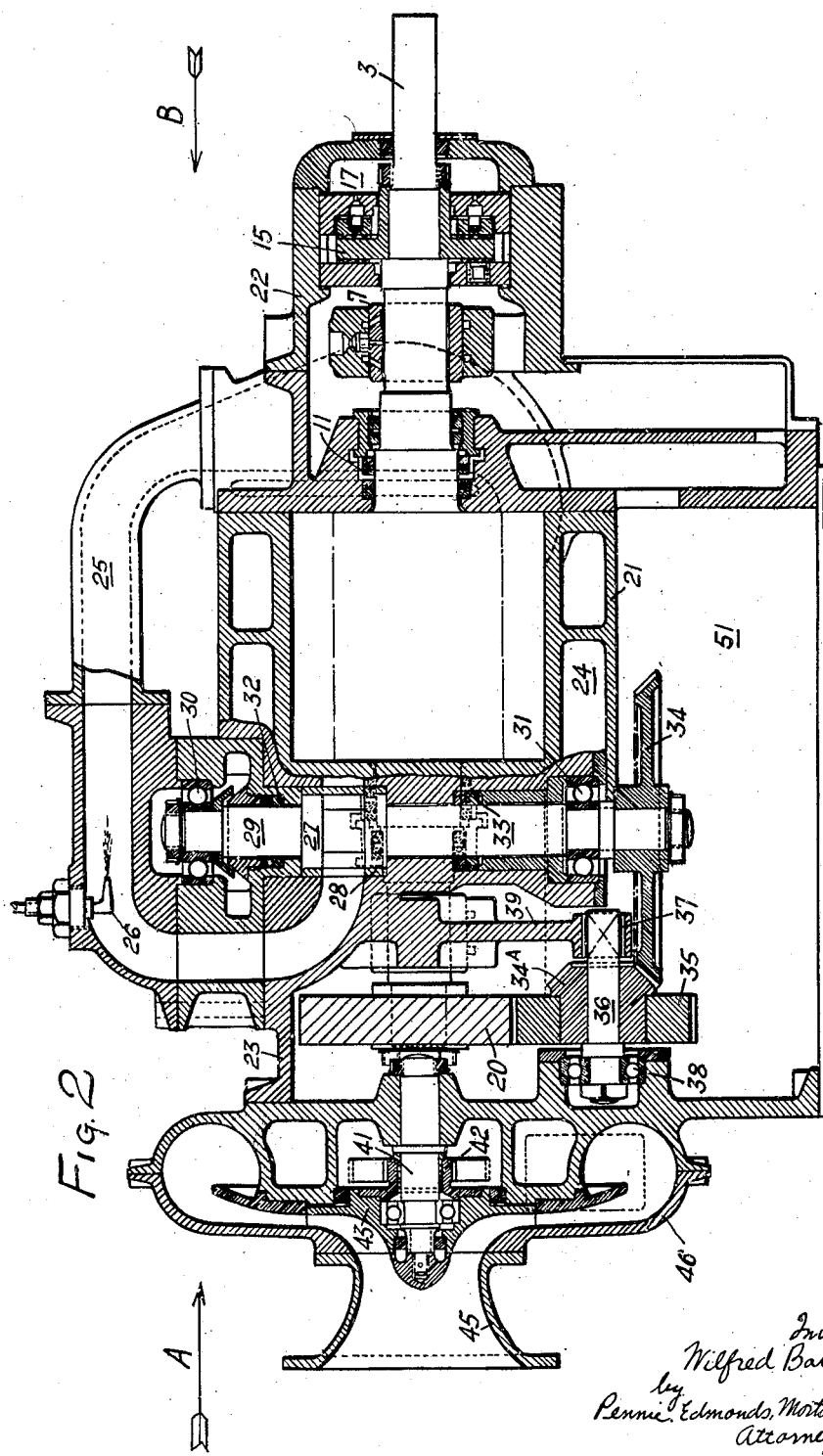
Figure 3:
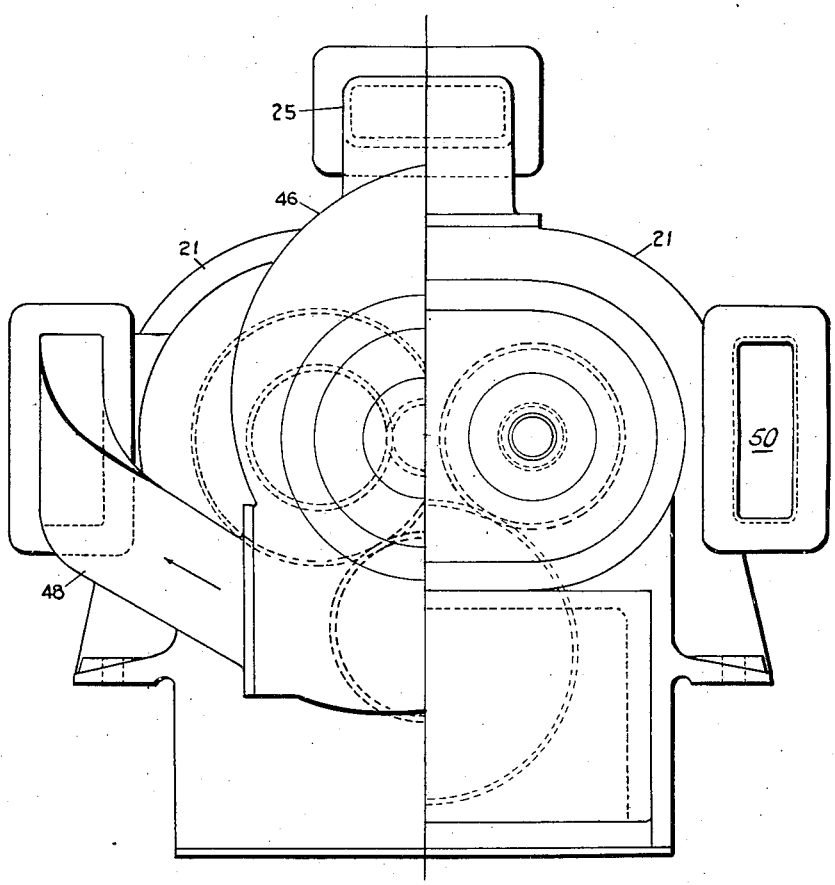
Figure 5:
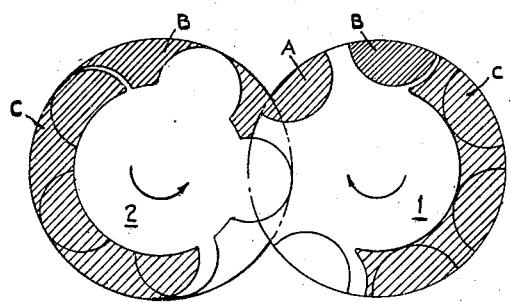
Figure 4:
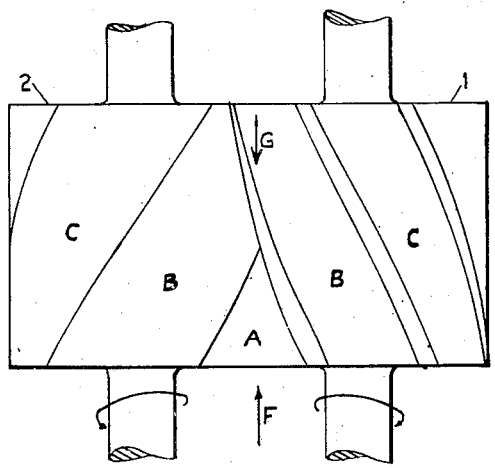
Figure 6:
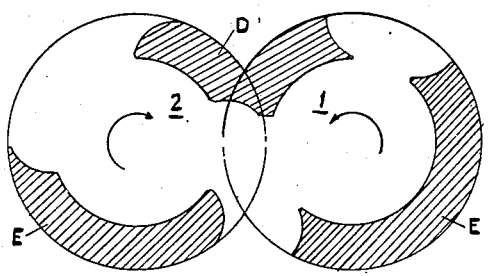
Figure 7:
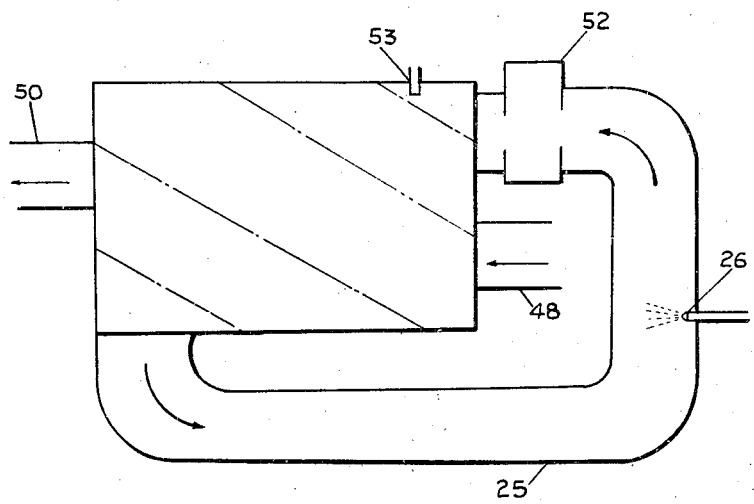

A practical embodiment of the invention is illustrated in the accompanying drawings in which Fig. 1 is a plan view showing the engine in part section, and Fig. 2 is a section through the line X—X in Fig. 1. Fig. 3 is a composite end elevation looking from opposite ends of the engine, the left hand half of Fig. 3 being a view in the direction of the arrow A in Fig. 2, and the right hand half of Fig. 3 being a view in the direction of the arrow B in Fig. 2. Figs. 4, 5 and 6 are diagrams showing the disposition of the rotors and ports, Fig. 5 being a view looking towards the front or inlet end of the rotors in the direction of the arrow F in Fig. 4, and Fig. 6 being a view looking towards the rear or exhaust end of the rotors in the direction of the arrow G in Fig. 4. Fig. 7 is a diagram for explanatory purposes only showing the essential parts of the engine.

In the drawings, 1 and 2 denote rotors carried by shafts 3, 4 and 5, 6, respectively, supported in bearings 11, 12, 13 and 14, respectively. 15 and 16 denote thrust collars co-operative with thrust bearing elements 17 and 18. Intermeshing pinions 19 and 20 fixed to the shafts 4 and 6, respectively, maintain the rotors 1 and 2 in proper angular relationship. 21 denotes the casing and 22 and 23 denote end covers attached to the casing 21 and supporting the bearings 11, 12, 13 and 14. 24 denotes a passage for cooling fluid. 25 denotes the transfer conduit in which is disposed the fuel injection nozzle 26. 27 denotes a rotary valve element rotatable in a ported sleeve 28 and mounted on a shaft 29 supported in bearings 30 and 31, one end of the transfer conduit 25 terminating at said ported sleeve 28. 32 and 33 are packing rings. 34 denotes a bevel gear wheel fixed to the shaft 29 and meshing with a bevel gear wheel 34A fixed to a pinion 35 in mesh with the pinion 20. The bevel gear wheel 34A and the pinion 35 are carried by a lay shaft 36 mounted in bearings 37 and 38. 39 denotes a suspender for the bearing 37.

40 denotes a pinion fixed to the shaft 6 and meshing with a pinion 42 rotatable on the fixed shaft 41. 43 denotes an impeller operatively connected to the pinion 42 and supported on a bearing 44. 45 denotes a converging inlet duct and 46 denotes a scroll chamber disposed to receive efflux from the impeller 43. 47 and 48 denote ducts connecting the scroll chamber 46 and the scavenging air inlet ports of the engine. 49 and 50 denote exhaust ducts. 51 denotes an oil sump.

In Fig. 4, A indicates the combustion space formed in the groove in front of the point of full engagement of the tooth with the groove in which combustion is taking place, B indicates the grooves in which expansion of the working fluid is taking place, and C indicates the grooves aligned with the exhaust parts which are being scavenged.

In Fig. 5, the shaded area A indicates the outer end of the space A in Fig. 4, the shaded area B indicates the ends of the grooves B in Fig. 4, adjacent to the space A, and the shaded areas C indicate scavenging air inlet ports.

In Fig. 6, the shaded area D indicates the inlet port to the transfer conduit, and the shaded areas E indicate the exhaust ports. In Fig. 7, 52 denotes the rotary valve, and 53 denotes an ignition plug.

In practice, a fuel-air mixture is ignited in the space A. In expanding, the gases move the tooth forming one wall of the space A out of engagement with the groove forming the other wall of said space, and cause the rotors 1 and 2 to rotate in opposite directions, the space A during rotation of the rotors 1 and 2, lengthening in the direction towards the other end of the casing, the exhaust ports E are uncovered and the products of combustion escape to the exhaust ducts 49 and 50.

Rotation of the rotors 1 and 2 rotates the shafts 4 and 6, and the pinions 19 and 20, which being in mesh maintain the two rotors in correct angular relationship. The pinion 40 fixed to the shaft 6 rotates with the shaft 6 and in turn rotates the pinion 42, which, being connected to the impeller 43, rotates the impeller 43, draws in air through the converging inlet duct 45 and forces the air under pressure into the scroll chamber 46. Air from the scroll chamber 46 flows along the ducts 47 and 48 to the scavenging air inlet ports C of the engine. The continuing rotation of the rotors 1 and 2 brings one end of the grooves containing the remains of the exhaust gases opposite the scavenging air inlet ports C. Scavenging air issues from said ports C, drives the remaining products of combustion through the exhaust ports E which are still open into the exhaust ducts 49 and 50, partly cools the rotors, and fills the grooves with fresh air.

Continued rotation of the rotors 1 and 2 causes the grooves containing the fresh air to be isolated from the scavenging air inlet ports C and the exhaust ports E, and when on further rotation the groove of one rotor containing fresh air engages a tooth of the other rotor, the trapped air in said groove is compressed. The inlet port D to the transfer conduit 25 is now uncovered by the ends of the teeth of the rotors 1 and 2, and the trapped air passes into the transfer pipe 25. The air passes along the transfer conduit 25 to the ported sleeve 28, on its way receiving fuel from the fuel injection nozzle 26. The rotary valve element 27, rotated from the shaft 6 by way of the pinion 20, the pinion 35, the bevel gear wheels 34A and 34, and the shaft 29, is timed to admit fuel-air mixture from the transfer conduit 25 to the casing 21 at the correct time and place where a tooth on one rotor is commencing to leave the co-operating groove on the other rotor, thus forming a combution space A towards the front of the rotor. The rotary valve element 27 closes, the fuel is ignited by the ignition plug 53, and the cycle is repeated.

The above described cycle of operations recurs as each tooth on one rotor interacts with the corresponding groove in the other rotor, several cycles being in course of performance at any instant, each cycle being at a different stage, and a smooth turning effort being thereby obtained.

What is claimed is:

1. A rotary internal combustion engine comprising a casing having an exhaust port and a front and a rear end, two cooperating coaxial rotors within said casing, said rotors having an inlet end facing towards the front end of the casing, and an exhaust end facing towards the rear end of the casing, one of said rotors having at least one helical groove of a predetermined pitch in its outer periphery, the other of said rotors having at least one helical tooth of said predetermined pitch and of opposite direction on its outer periphery, said rotors being positioned so that the tooth engages the groove when the rotors are oppositely rotated, said tooth and its corresponding groove forming a combustion space in front of the point of full engagement of the tooth with the groove, valve means for admitting fuel into said combustion space, a transfer conduit having one end communicating with the interior of the casing opposite a predetermined angular position of the groove of the grooved rotor and substantially at the point where the exhaust end of said tooth terminates full engagement with the exhaust end of the groove, the other end of said transfer conduit being in communication with said combustion space, said transfer conduit being adapted to transfer compressed air from its first-mentioned end into the combustion space, means for igniting the fuel and air in the combustion space, said exhaust port communicating with the interior of the casing opposite a predetermined angular position of the groove of the grooved rotor, and at a time where the tooth is disengaged from the groove along its entire length, and valve means for admitting scavenging air to the groove while it contains combusted gases and when it is aligned with said exhaust port.

2. A rotary internal combustion engine as defined in claim 1 in which the interior of the casing is formed with a port spaced at a predetermined angular position of the groove and opposite the inlet end of said groove, which port cooperates with the inlet end of the groove during rotation of the rotor to constitute valve means for admitting the scavenging air to the groove.

3. A rotary internal combustion engine as defined in claim 1 which includes means for introducing fuel into the transfer conduit.

4. A rotary internal combustion engine as defined in claim 1 which includes at least one gear rotatable with one of said rotors and at least one gear rotatable with other rotor and intermeshing with said first gear to keep the groove and tooth in proper intermeshing engagement.

WILFRED BAILEY.

REFERENCES CITED

The following references are of record in the file of this patent:

UNITED STATES PATENTS

| Number | Name | Date |
|---|---|---|
| 1,135,648 | Ahlm | Apr. 13, 1915 |
| 1,255,403 | Gardner | Feb. 5, 1918 |
| 1,287,268 | Edwards | Dec. 10, 1918 |

FOREIGN PATENTS

| Number | Country | Date |
|---|---|---|
| 468,390 | Great Britain | July 2, 1937 |